Aug. 22, 1944.  G. WIGGERMANN  2,356,365
WARPING MACHINE
Filed Jan. 4, 1941  10 Sheets-Sheet 1
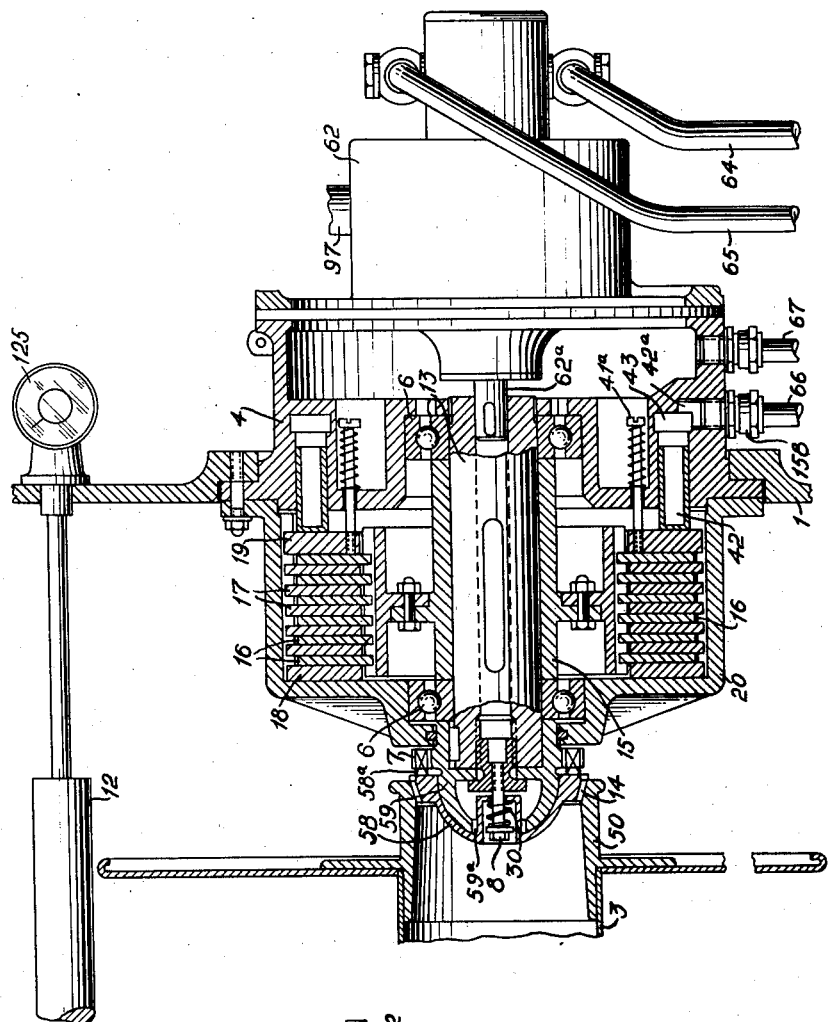
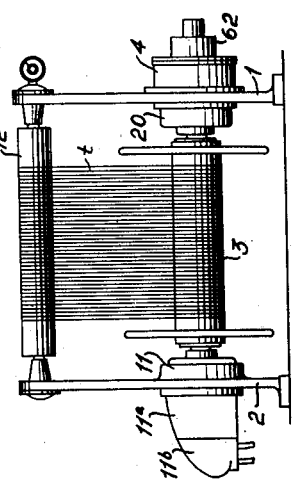
INVENTOR
GEORG WIGGERMANN
BY
ATTORNEY Aug. 22, 1944. G. WIGGERMANN 2,356,365
WARPING MACHINE
Filed Jan. 4, 1941 10 Sheets-Sheet 2
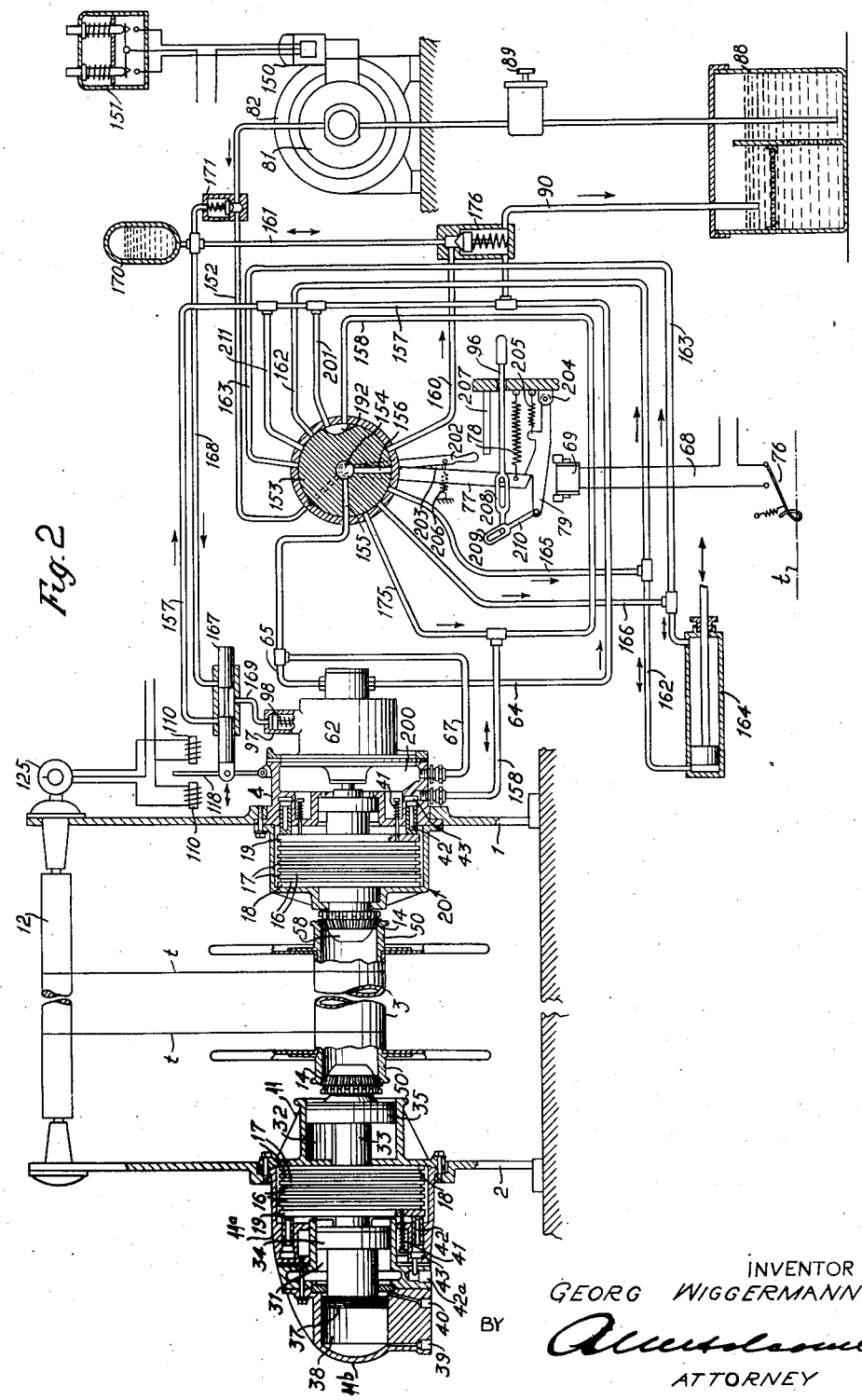
INVENTOR
GEORG WIGGERMANN
BY
ATTORNEY Aug. 22, 1944.  G. WIGGERMANN  2,356,365
WARPING MACHINE
Filed Jan. 4, 1941  10 Sheets-Sheet 3

INVENTOR
GEORG WIGGERMANN
BY
ATTORNEY

Aug. 22, 1944.    G. WIGGERMANN    2,356,365
WARPING MACHINE
Filed Jan. 4, 1941    10 Sheets-Sheet 4
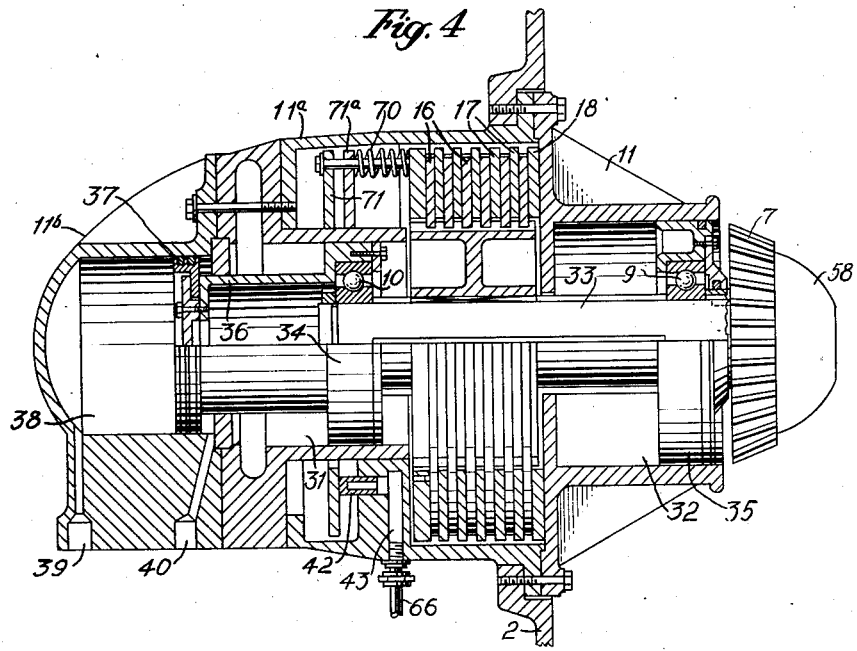
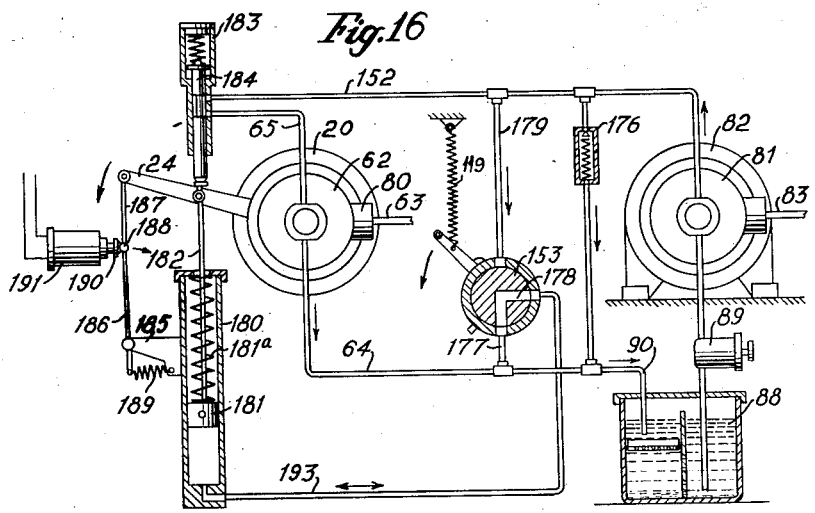
INVENTOR
GEORG WIGGERMANN
BY
ATTORNEY

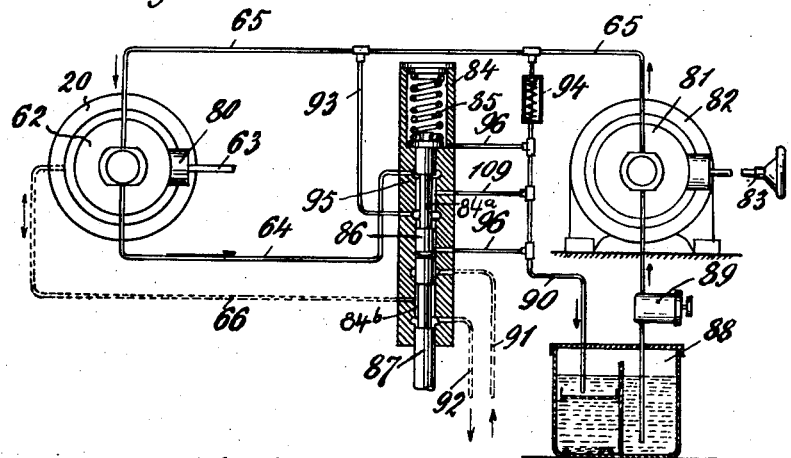
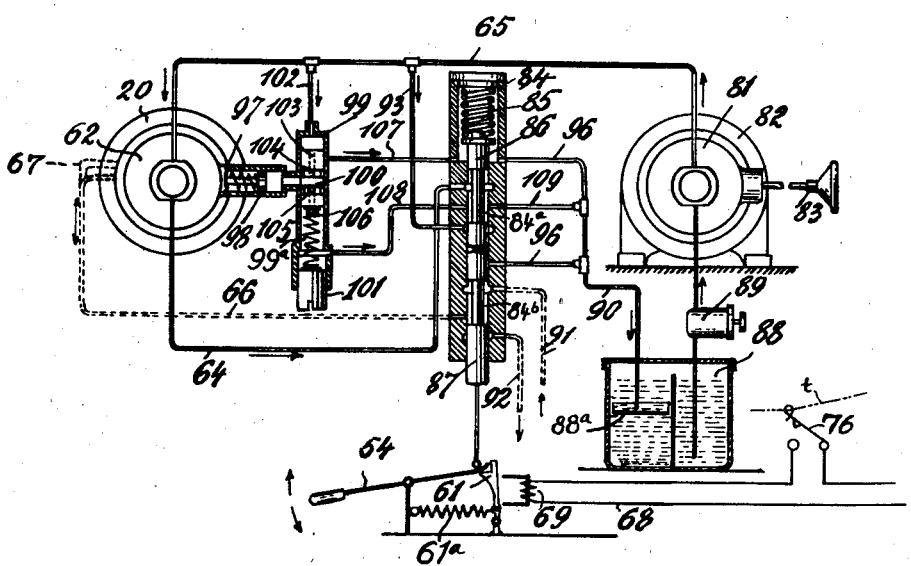

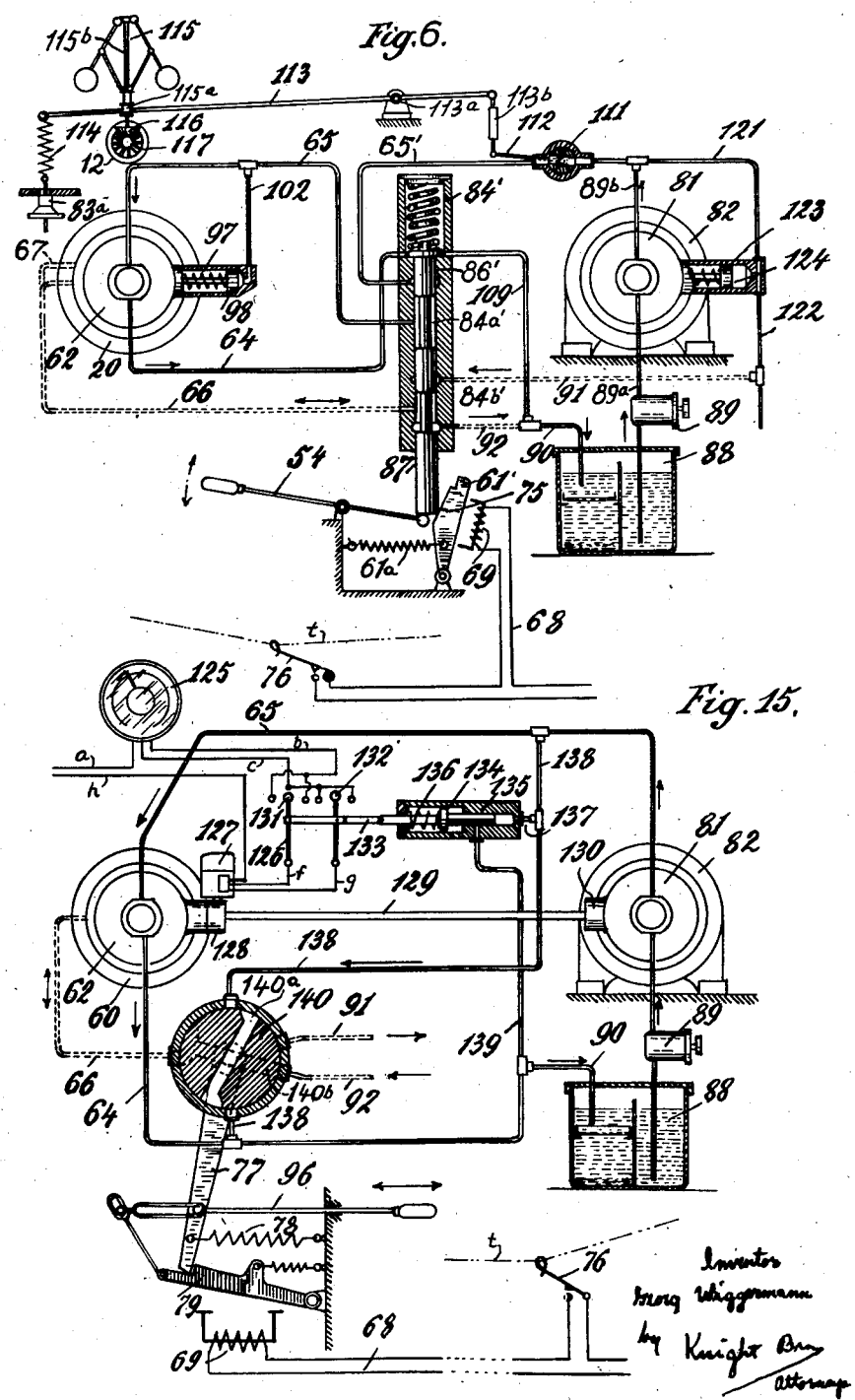

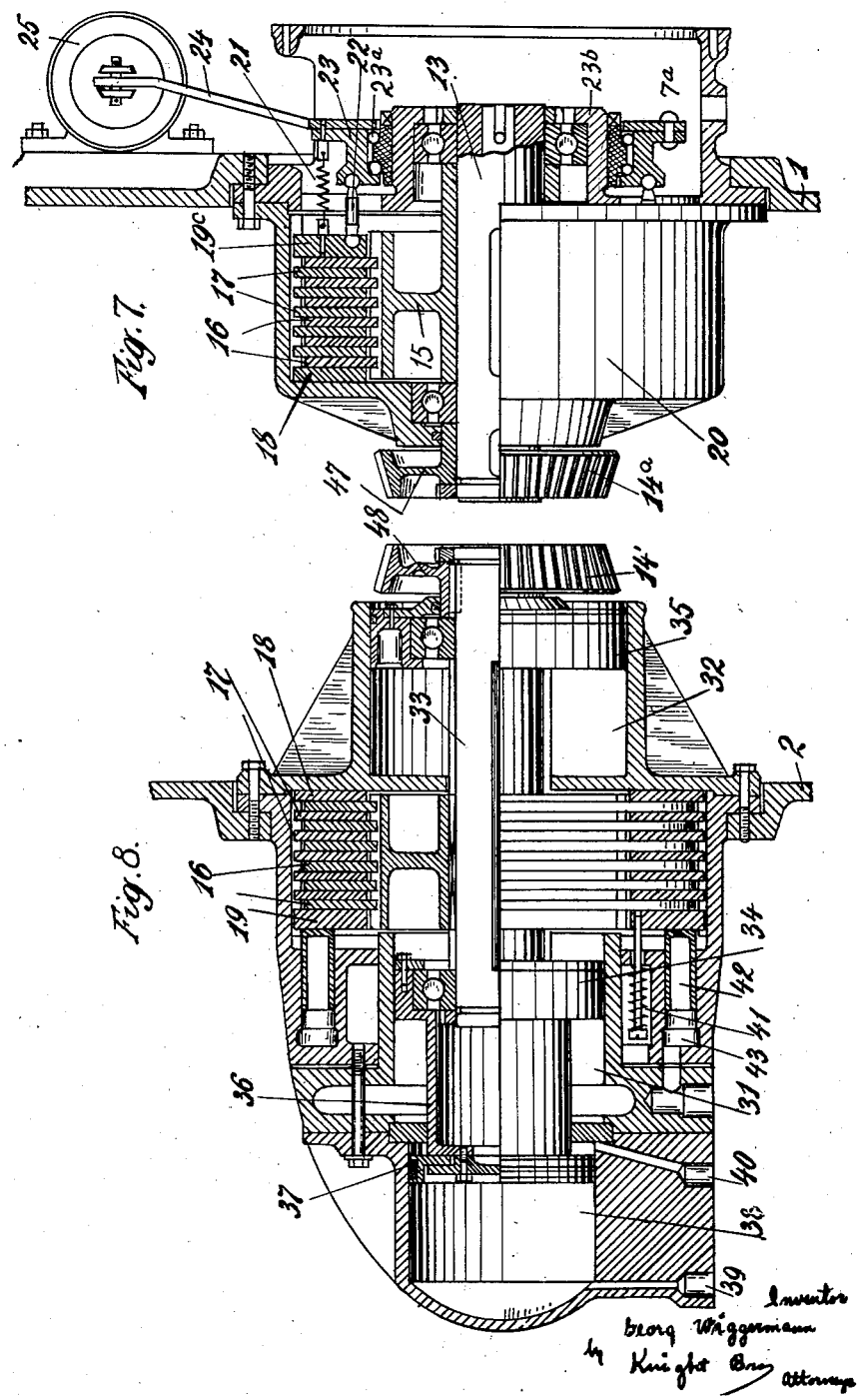

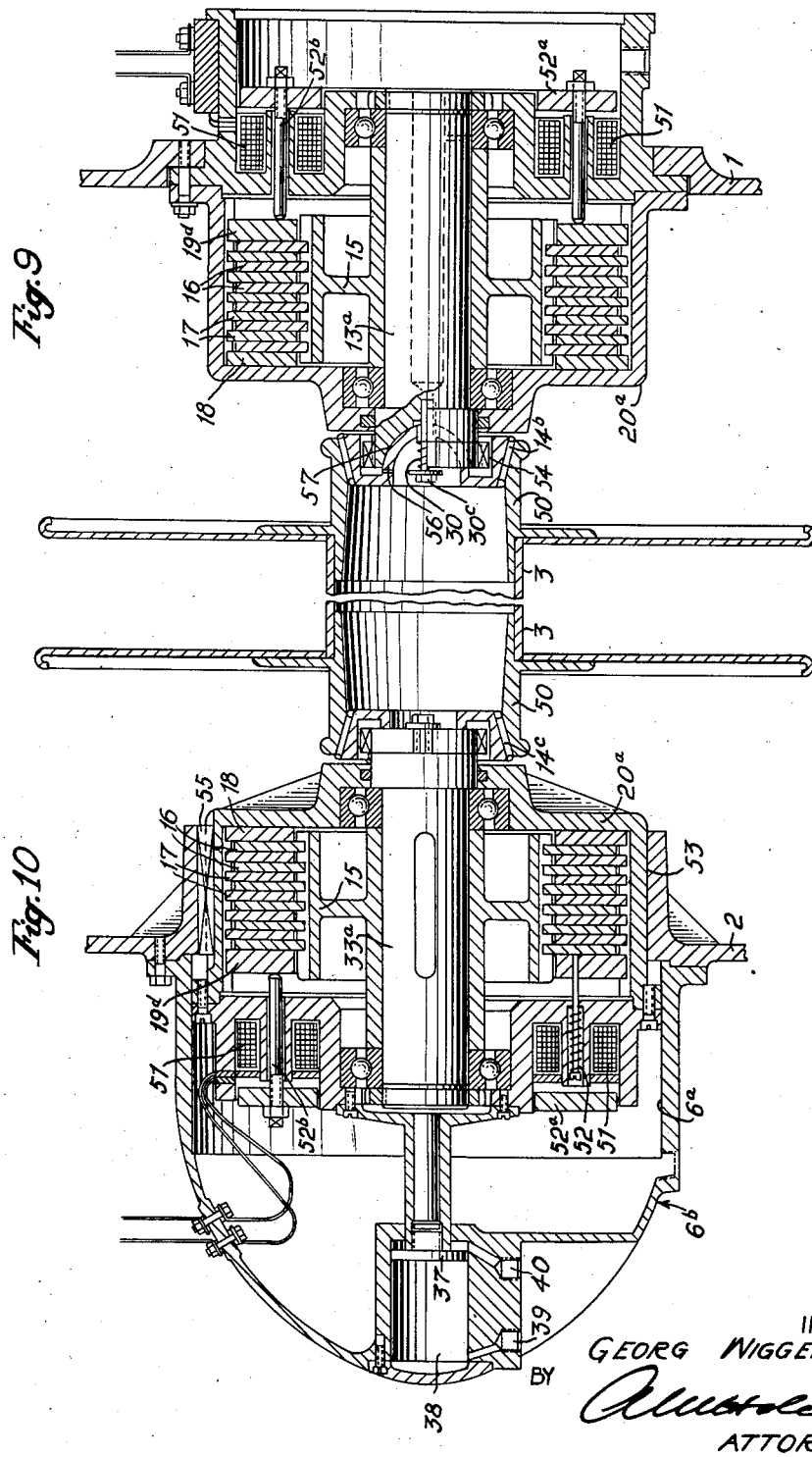

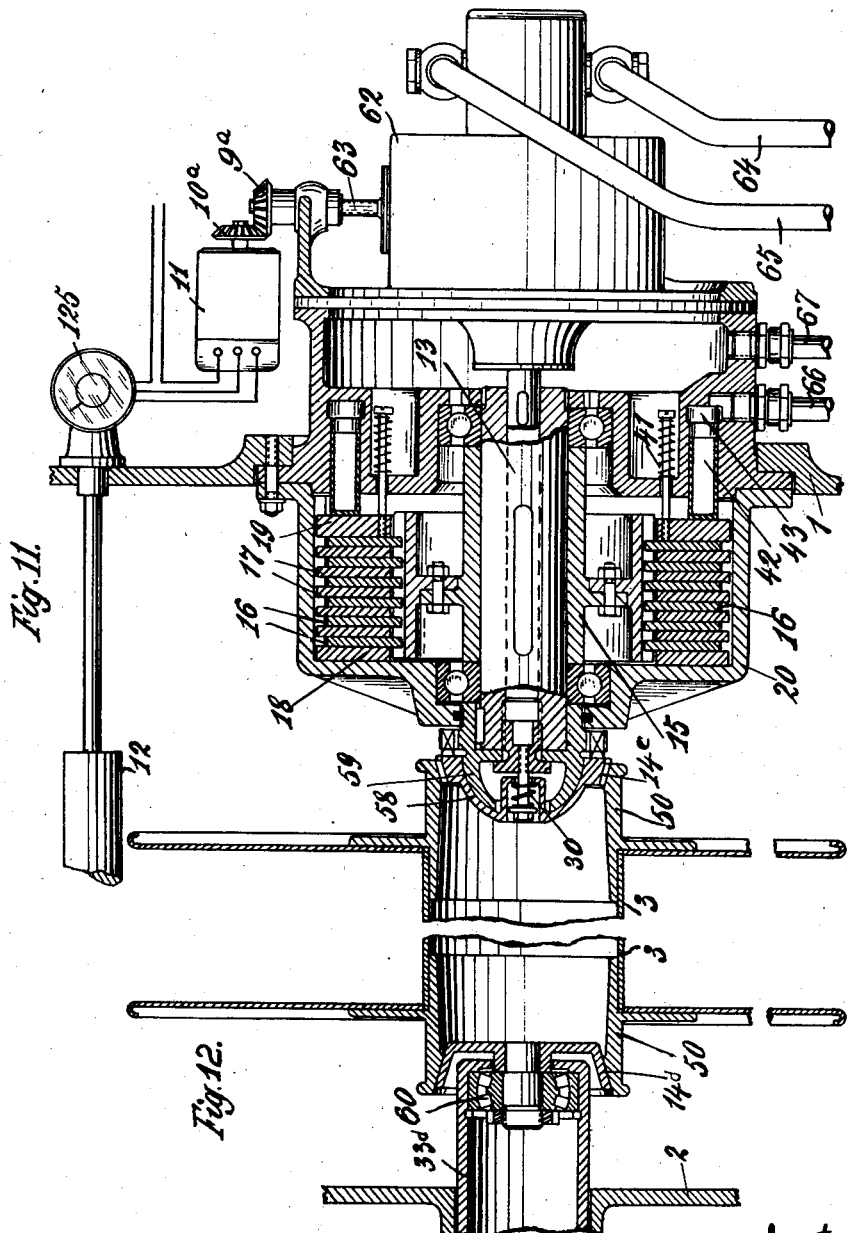

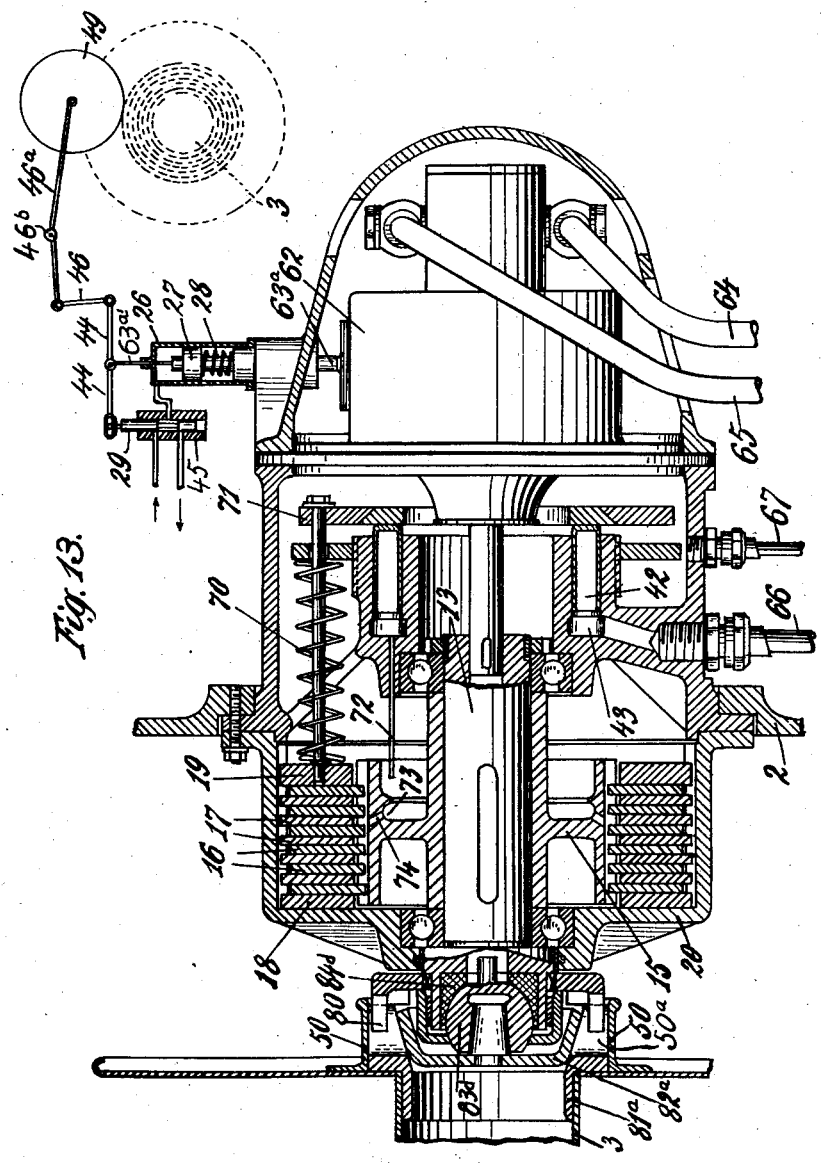

Patented Aug. 22, 1944

2,356,365

UNITED STATES PATENT OFFICE 2,356,365

WARPING MACHINE

Georg Wiggermann, Gladbach-Rheydt, Germany;
vested in the Alien Property Custodian Application January 4, 1941, Serial No. 373,136
In Germany June 5, 1939

26 Claims. (Cl. 28—36)

This invention relates to improvements in textile machinery such as warping machines whereby a plurality of yarn ends are simultaneously wound upon a warp beam, and more especially to apparatus of this character designed to reduce to a minimum the time for starting and stopping the warping machine.

Warping machines are commonly used in association with creel boards, which boards support a plurality of yarn cones or packages. A yarn end or strand is drawn from each package and wound in the form of a warp upon a warp beam supported by the warping machine, thereby transferring the total contents of the packages on the creel board onto the warp beam. Since each yarn end is very often several hundred yards in length it is necessary to operate the warping machine at as high a speed as possible so that a maximum production can be obtained. The increased speed, however, imposes a greater burden upon the machine, especially when starting and stopping. Furthermore, the diameter of the yarn upon the warp beam gradually increases, and therefore necessitates a correspondingly reduced rate of rotation of the warp beam driving mechanism in order for the linear speed of the warp to be maintained substantially constant.

It is therefore an object of this invention to provide a warping machine having a novel driving and braking apparatus associated therewith to quickly and effectively start and stop the machine.

It is another object of this invention to provide a warping machine of the class described in which the speed of a rotary driving means for the beam is directly controlled by the linear speed of the yarn to thereby maintain the linear speed of the warp substantially constant. Means are also provided for causing the braking mechanism to be automatically applied when the driving means is stopped.

It is another object of this invention to provide a warping machine having a fluid motor for driving the same, a braking apparatus for the machine, a common control means for stopping the motor and for simultaneously applying the brake, and a stop motion mechanism for automatically operating the common control means when a warp end breaks.

It is still another object of this invention to provide a warping machine of the class described having the above mentioned speed regulating and control apparatus, in association with a novel mechanism for removably supporting a warp beam in its operative position. This supporting means permits the beam to be mounted upon, and removed from, the machine with a minimum amount of time and effort, and also prevents journal slip between the beam and the supporting elements during operation.

Some of the objects of the invention having been stated other objects will appear when taken in connection with the accompanying drawings, in which:

Figure 1 is a diagrammatic side elevation of a warping machine embodying one form of the invention; but omitting the fluid pump, the regulators and automatic control mechanism;

Figure 2 is a sectional assembly view, similar to Figure 1, in association with, a fluid pump, fluid motor regulators, and automatic control mechanism;

Figure 2A is a detail view of the beam driving support shown in the central portion of Figure 2;

Figure 4 is an enlarged sectional view showing a modified form of supporting and braking structure for the other end of the warp beam; said structure being adapted for use in association with the structure shown in Figure 3;

Figure 5 is a schematic view illustrating a modified form of the invention in which the regulator of the motor is influenced by alterations in the pressure of the driving medium flowing to the motor, said modified form being used in association with the supporting structure shown in Figures 3 and 4;

Figure 6 is a schematic view of another modified form of the invention illustrating a warping machine in association with a fluid driving motor, a fluid pump, fluid regulators, stop motion and a governor for regulating the flow of fluid from the pump to the motor in turned relation to the movement of the warp.

Figures 7 to 13 are side elevational and vertical sectional views of drive shaft and counter shaft heads of warping machines, illustrating different features of the invention, as follows:

Figure 7, a drive shaft head illustrating the control of the brake by a piston situated outside the brake casing;

Figure 8, a countershaft head illustrating the control of the brake by means of a ring piston with an axially shiftable centering disk;

Figures 9 and 10, drive shaft and countershaft heads illustrating the control of the brake by means of built-in electromagnets with a stationary and an axially shiftable centering disk, respectively;

Figure 11, a drive shaft head with the same construction of brake as in Figure 2A, showing a motor flanged onto the brake casing;

Figure 12, an axially shiftable countershaft with swivelled centering disk and without brake;

Figure 13, a modified form of the construction shown in Figure 11;

Figure 14 is a diagrammatic view of a fluid drive for a warp beam in which the motor is provided with a regulator adapted to be influenced by an element such as shown in Figure 11 of the warping machine, which element responds to alterations of the winding procedure;

Figure 15 is a diagrammatic view of another modified form in which the control of the regulators is effected with the aid of an electromotor;

Figure 16 is a diagrammatic view of still another form of construction showing the control of a piston acting upon the brake and a valve controlling the admission of the driving fluid to the motor, said driving fluid being tapped off from the pressure conduit of the pump.

In the following specification the three principal forms of the invention are first described. The first form is embodied in Figures 3, 4, 5 and 5A; the second form is embodied in Figures 1 and 6; and the third form is embodied in Figures 1, 2 and 2A. The additional forms incorporated in Figures 7 to 17 inclusive are directed to allied subject matter and seek to accomplish substantially the same broad purpose in a different manner.

Figure 3:
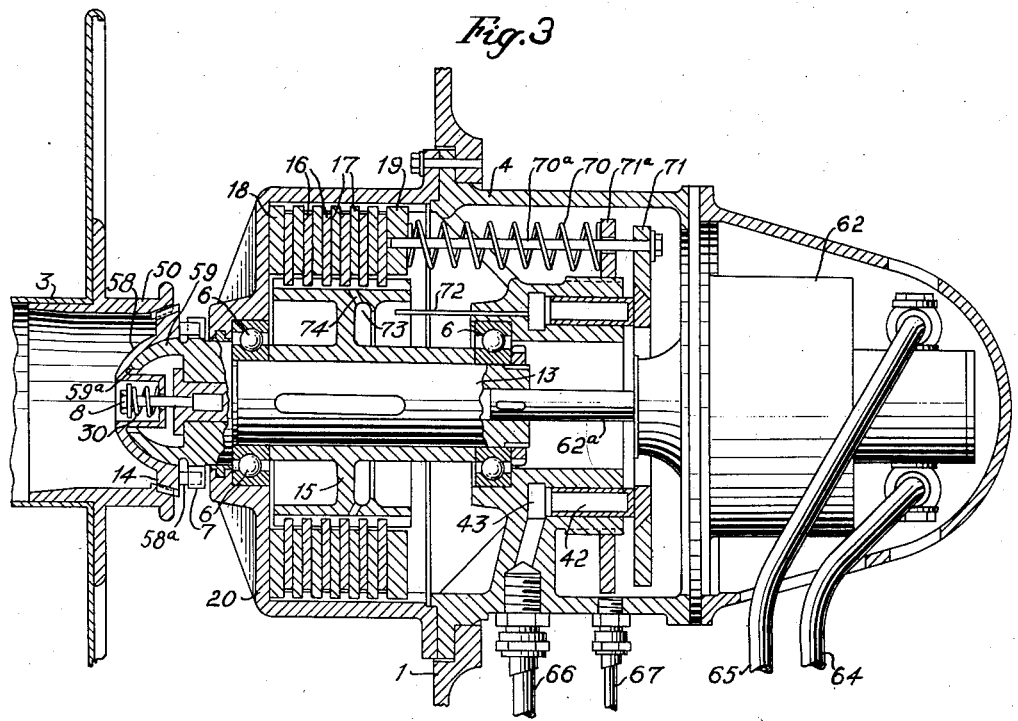
Figure 3 is an enlarged sectional view, showing a modified form of driving, braking and supporting structure for one end of a warp beam.

Referring more particularly to the drawings the numerals 1 and 2 denote spaced frames or samsons between which is removably supported a warp beam 3 by means of a structure to be hereinafter described. (Figures 1, 3 and 4.) This beam is adapted to have a plurality of warp ends t wound thereon, said ends being adapted to pass over a measuring roll 12 prior to being wound upon the beam. Measuring roll 12 is also supported between frames 1 and 2 and in parallel relation to beam 3.

FIRST FORM (FIGURES 3, 4, 5 AND 5A)

*Driving support for one end of beam*

The frame 1 has secured thereto (Figures 2 and 3) a housing 4, one end of which supports a fluid motor 62 and the other end supports a brake housing designated by reference character 20. Motor 62 has a shaft 62a extending therefrom, said shaft being secured to an alined shaft 13 fixedly secured within hub member 15. The members 13 and 15 are rotatably supported in housing members 4 and 20 by any suitable means such as ball bearings 6.

The left hand end of shaft 13 (Figure 3) has a hemispherical member 59 fixedly secured thereon, said member having a series of peripheral gear teeth 7 between which laterally extending teeth 58a of seat member 58 are adapted to fit and thereby provide an interengagement between members 58 and 59. In order to yieldingly secure the seat member 58 to the member 59 a stud bolt 8 and spring 30 are provided, the bolt being an extension of shaft 13 and slidably penetrating the center of seat member 58, whereas the spring 30 is disposed around the projecting portion of the bolt. It can be seen that a limited amount of universal movement of the seat member can take place on account of the clearance between the central portion of seat member 58 and the bore 59a in hemispherical member 59.

Integral with the periphery of seat member 58 is a conical toothed centering disk 14, and this disk is adapted to engage a series of similar teeth disposed on the interior of a hub 50 on one end of beam 3. It is therefore seen that the interengaging teeth of members 14 and 50 serve to removably unite the warp beam with the driving means, whereas the universal connection between members 58 and 59 serves to insure that the centering disk will properly engage the hub.

*Countershaft support for other end of beam*

The supporting means for the opposite end of beam 3 is similar in many respects to the supporting means just described. For example, the toothed interengagement between members 14 and 50, and the universal movement as provided by members 8, 30, 58 and 59 are likewise present in the countershaft support. (Figures 3 and 4.) The last named members 8, 30, 58, 59, 14 and 50 are secured on the end of a shaft 33, which shaft is slidably and rotatably held in alined position with shaft 13. In other words, the countershaft head as shown in Figure 4 has suitable cylindrical bores 31 and 32 in which the shaft 33 is securely guided by means of sliding pistons 34 and 35 when the shaft 33 is axially shifted.

The right hand end of shaft 33 has a suitable roller bearing 9 disposed therearound, said bearing being disposed within piston 35. A similar bearing 10 is disposed around the left hand end of shaft 33 and the latter bearing is disposed inside the piston 34. These bearings 9 and 10, therefore rotatably support countershaft 33 within pistons 35 and 34.

Integral with the left hand end of piston 34 is a hub 36, said hub having a control piston 37 secured thereto. The control piston 37 is slidably mounted in a cylinder 38 and is adapted to be moved by means of a pressure fluid admitted through conduits 39 and 40. When it is desired to remove or insert the ends of a beam 3 between the supporting heads the members 33, 35 and 37 are axially shifted accordingly.

The housing structure for the countershaft supporting mechanism is designated by reference characters 11, 11a and 11b.

*Braking mechanism*

The hub 15 on shaft 13 has a toothed periphery (Figure 3) engaging internal teeth of ring-shaped disks 16, surrounding the hub. The disks 16 are separated from one another by disks 17, said disks having the axial movement thereof limited by means of end disks 18 and 19. Disks 17, 18 and 19 have suitable outer teeth which mesh with teeth on the interior periphery of housing 20, and are thereby secured against being turned by the disks 16. These disks are nevertheless axially shiftable, similar to the conventional multi-disk brakes.

The instantaneous braking of shaft 13 is effected by springs 70, uniformly distributed on the right hand side of ring 19, said springs acting in opposition to the action of several compression pistons 42 arranged in a circle. Each spring surrounds a stud bolt 70a, which bolts extend from ring 19 and penetrate rings 71 and 71a. The opposition forces are applied by means of a plurality of pistons 42 which are slidably mounted in bores 43 in housing 4. When fluid pressure is admitted into the bores by way of opening 43 the pistons are moved against rings 71 and in opposition to springs 70 to thereby relieve the friction between the non-rotatable disks 17 and the rotatable disks 16. Since the disks 16 are secured to beam supporting shafts 13 and 33 any increased friction between the disks and disks 17 will serve as a braking action. The braking mechanism for the drive shaft 13 and the countershaft 33 is substantially the same and operated in substantially the same manner.

Operating control mechanism for warper

In Figure 5 a hydraulic driving unit is employed for the warping machine. A pump 81 of the hydraulic driving unit is secured to a motor 82 and can be adjusted through a control shaft 83 to any desired fundamental speed, determined, for instance, by the kind of yarn being wound upon the beam 3.

Suitable pipes 64 and 65 serve to supply the driving fluid under pressure to the motor and to return the exhausted fluid from the motor. The driving fluid may act also as a pressure medium, upon the pistons 42 to relieve the braking action in opposition to springs 70, said fluid for the braking action being admitted to the pistons through pipe 66. If a pressure fluid capable of lubricating is selected, an oil conduit 67 may also be connected to the piping for the motor and the brake.

Control of fluid flow to motor

For controlling the supply of fluid under pressure to the motor 62 and the return flow of the driving medium, as well as for controlling the supply and return of the medium operating the motor brake, i. e. gas, steam, air or other fluid, a control cylinder 84 is provided, containing pistons 86 and 87. These pistons can be shifted from a lowered stop position (Figure 5A) to the raised driving position as shown (Figure 5) and maintained in the latter position in opposition to the pressure of a compression spring 85 within cylinder 84.

The means for shifting pistons 86 and 87 comprises a hand lever 54 which on being depressed lifts the pistons 86 and 87 and stops the same in driving position. A pawl 61 and a spring 61a serve to latch the parts in raised position.

When the pistons are in raised position the pump 81 sucks up the driving medium from a container or reservoir 88 through a filter 89 and forces it through the conduit 65 to the motor 62. After leaving the motor the driving medium flows back through conduits 64, 109, and 90 to the reservoir 88, in which a suitable mechanical cleaning means such as a sieve-overflow element 88a is provided.

Figure 5A:
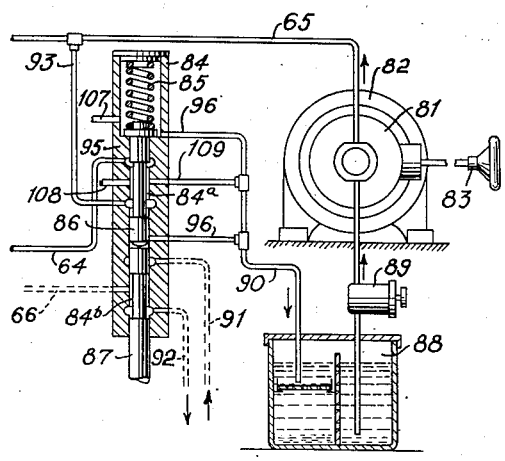
Figure 5A is a view similar to Figure 5 but showing the parts in different operating positions.

As shown in Figure 5 when a thread t of the warp breaks during operation, the circuit 68 is closed by a stop motion switch 76, and thus an electromagnet 69 is excited which attracts the pawl 61 and releases the pistons 86 and 87, thereby permitting the spring 85 to force the pistons downwardly to the position shown in Figure 5A.

When the pistons are in the lowered position as shown in Figure 5A the motor fluid circuit 64 and 65 is short circuited by a conduit 93 leading to the valve chamber 84a, thence directly to the return pipes 109 and 90. Simultaneously with the above-mentioned short circuiting the piston 87 closes the conduit 91 from which pressure fluid was being supplied through a valve chamber 84b and pipe 66 to the braking mechanism. The pressure in the conduit, therefore sinks instantaneously and the brake is applied to stop the warping machine.

The braking effect is assisted by the reflex of the driving medium in the conduit 64 as the discharge from the conduit 64 is impeded by a throttling at 95.

In this form of the invention (Figure 5), the slowing of the revolving speed of the beam 3 is effected according to the increasing diameter of yarn, without any of the known control means being influenced from an element of the warping machine which responds to alterations of the winding procedure.

With this object in view, a separate control cylinder 99 is coordinated to the motor regulator, said motor regulator comprising cylinder 97 and piston 98.

In the control cylinder 99 a piston 100 is mounted which is regulated to normal position in Figure 5 by the action of a spring 99a and by means of an adjusting screw 101. The piston 100 has grooves 104 and 105 which communicate with the cylinder spaces at the respective ends of the piston, through central ducts 103 and 106. The upper cylinder space is connected to the main supply pipe 65 by a pipe 102. The control cylinder 99 is connected with the control cylinder 84 by conduits 107 and 108. Draining conduit 96 is provided for relieving the control cylinder 84.

The principle of operation of the regulating system shown in Figure 5 is that upon increasing the load of the motor 62, owing to the increasing beam diameter, the pressure in the circuit 65 tends to rise. Therefore, the pressure in the upper portion of the control cylinder 99 increases and piston 100 is pressed downwardly, to thereby cause an increase in pressure in motor regulating cylinder 97. This increase in pressure will shift control piston 98 to the left (Figure 5) to increase the flow capacity of the motor, whereby the revolving speed is reduced accordingly.

If the relief of conduit 65 overshoots, the piston 100 serves also for equalization by instantaneously relieving the control cylinder 97 by means of a groove 105, bore 106 and duct 108, when the pressure in the upper portion of the control cylinder 99 sinks below the value adjusted by means of set screw 101.

Second Form (Figures 1 and 6)

In the form of the invention shown in Figures 1 and 6 a control cylinder 84' is provided for controlling the flow or driving medium, in which cylinder a piston 86'—87' moves, said piston being made in one piece. The control piston 86'—87' is shown in Figure 6 in the position it assumes when the machine is at a standstill. The shift into driving position is effected by the same means as explained with reference to Figure 5, with the difference that the pawl 61' has an inclined face 75 which slidably contacts the lower end of piston 86'—87'. When the piston is raised the spring 61a rotates the latch 61' beneath the piston to latched position.

The stop motion control is illustrated diagrammatically and designated by 76. When the piston 86'—87' is in driving position the pump 81 sucks up the driving medium from the container 88 through a filter 89 and a pipe 89a, and then forces it through the conduits 89b, 65' and 65 to motor 62. Thence it flows through the conduits 64, 109, and 90 back to reservoir 88.

The flowing medium used for controlling the brake is tapped from the pressure side of the pump by connecting the brake supply conduit 66, 91 with a branch conduit 122, 121 connected to the pressure side of the pump, and the brake discharge conduit 92 is connected to the general return conduit 90. Therefore the brake 20 is influenced by the driving medium from the pump, which means in the present instance that the brake is held thereby in the released state.

The regulator 83a for adjusting the fundamental speed acts upon a spring 114 connected to the end of a lever 113 fulcrumed at 113a. This spring is more or less tensioned, to adjust a governor 115, whose sleeve 115a is connected to the lever 113 and whose shaft 115b is driven through bevel gears 116, 117 from the measuring cylinder 12 of the warping machine. The lever 113 is connected by a link 113b to the arm 112 of a valve 111 inserted in the main supply line 65'. The valve 111 throttles the main supply line more or less, according to the adjusted fundamental speed and the supplementary control of the governor 115. According to the speed at which the warping is being carried out at the moment, the measuring clyinder revolves more rapidly or more slowly, so that the regulator 115 lifts the rod 113 more or less, in opposition to the regulated tension of the spring 114 and thereby regulates the quantity of the driving medium admitted to the motor through the conduit 65 according to the speed of the running threads. The shutting off of the supply of the driving medium to the motor 62 is brought under the control of the control piston 86' itself, by leading the conduit 65—65' through the control cylinder 84'.

The tapping off of driving medium for controlling the brake 20 has already been explained. The driving medium may, however, as already mentioned, be used also for carrying out other operations. Another control cylinder 124 with control piston 123 is, according to the invention, arranged between the conduit 122 and the conduit 121 leading to the conduit 65—65' for the driving medium, by which control cylinder the pump 81 is influenced, so that, independently of the pressure in the conduit 122, the pressure of the driving medium for the conduit 65—65' is maintained uniform by altering the pump efficiency.

THIRD FORM (FIGS. 1, 2 AND 2A)

The construction shown in Figure 2 provides an electromotor 150 for regulating the pump 81, said electromotor being connected to the power line by means of a push knob switch 151. The pump 81 sucks the driving medium from the container 88 through a filter 89 and forces it through the conduits 152, 65 to the motor 62, whence it can flow back to the reservoir 88 through the conduits 64 and 90.

The driving medium acts through the conduit 158 upon the ring piston of brake 20 in order to release this brake or to apply the same (see Figure 2A). The tapping off of the driving medium for operating the brake is effected by turning a valve 153, so that the bore 155 of this valve is connected with the mouth of the branch-conduit 175 of the conduit 158, whereas the mouth of the conduit 158 is shut off at the rotary valve, as shown at the right hand side of the drawings, by movement of the cavity 192 away from it. As by this turning of the valve at the same time bore 156 is connected with conduit 160, the driving medium communicates at the same time through the conduit 161 with an air chamber 170 through a relief valve chamber 176. By further turning of the rotary valve 153, the bores of the rotary slide may be connected also with the conduits 162, 163 of any control cylinder 164. For instance, when the bore 155 comes into register with the connection of the conduit 165, the trough shaped recess 192 of valve 153 connects the conduit 163 with the conduit 157 leading to conduit 90, while the conduit 162 is closed by the valve 153. Thus the pressure fluid flows through pipes 165 and 162 into the left end of cylinder 164 and throws the piston therein to the right. In order to move back the piston in the cylinder 164 it is only necessary to turn the valve 153 to bring the duct 156 opposite the conduit 166 which closes the conduit 163 at the valve and connects the conduit 162 by the recess 192 through the longer one of the two connections with the conduit 157.

In Figure 2 the rotary slide 153 is shown in driving position. In this instance the driving medium flows from the pump 81 through the conduit 152, the central bore 154, the bore 155 and the conduit 65 to the motor and thence through the conduits 64 and 90 back to the reservoir 88. The brake conduit 158 is then relieved, as it is also connected by the recess 192 of the valve and conduit 157 with the conduit 64.

The air chamber 170 is further connected through a check-valve 171 with the pressure conduit 152 of the pump and can act, through a control slide 167 and a conduit 169, upon the regulator 97, 98 of the motor 62 and correspondingly alter the flow capacity of the motor.

The control of slide 167 and thereby of a winding speed, which is to remain uniform, is effected for instance by a contact-tachometer 125 operated by the measuring roll 12. The control impulses are imparted by electromagnets 110 energized by the contact-tachometer 125, between which elctromagnets a tiltable armature 118 is situated, which is connected with slide 167. The air chamber is further connected by the conduit 161 with the safety valve 176 so that the pressure loading is limited.

Attention is called to the slight difference in the structure for releasably holding and braking the warp beam. It will be noted that the braking forces in the form of invention shown in Figures 2 and 2A are supplied by pistons 42, and that these braking forces are, in turn, normally resisted by springs 41. In Figures 3 and 4 the reverse arrangement is shown, namely the braking forces are supplied by springs 70 in opposition to the fluid actuated pistons 42.

The machine operates in the following manner:

In the position of rest the lever 77 is released from pawl 79 and stands against stop 207, the duct 155 being thereby in communication with pipe 175 and the pressure line 152 thus connected with the chamber 43 of the brake operating piston 42. When the pump 81 is started and pressure is up the brake is applied. The countershaft 33 is in its left end position and the centering disc 14 thereon spaced from the centering disc 14 on the drive shaft by a distance greater than the length of a beam. A warp beam is brought into position approximately centered with the centering discs 14 and fluid pressure is admitted through duct 39 to the chamber 38 at the left side of piston 37. The countershaft 33 is thrust to the right and the centering discs 14 become locked with the hubs 50 of the beam. The carriage on which the beam was brought up is removed and the beam is thus suspended on the shaft and countershaft supports. The warp thread is passed over measuring roller 12 and secured to the beam. The contact tachometer 125 is set to the desired warp speed. The pump is started and immediately builds up a pressure in the pressure line 152 and air chamber 170 to the point limited by relief valve 176. The rod 96 is thrust to the left and lever 77 caught by pawl 79. Duct 155 connects the pressure line 152 with pipe 65 and the motor 62 is set in operation. During the running of the machine a uniform warp speed is maintained by the contact tachometer 125 operating through its magnets 110 and control piston 167 to adjust the regulator 97 and thereby modify the flow capacity of the motor to reduce or increase its speed. If a thread breaks the stop motion device 76 is closed and electromagnet 69 attracts pawl 79, releasing lever 77, which swings until it strikes stop 207 and thus shifts the valve duct 155 from the motor supply pipe 65 to brake supply pipe 175. By this movement the brake relief pipe 158 is also cut off at the valve 153. The supply of pressure fluid to the motor is terminated and the brake is actuated to stop the warp beam. Any auxiliary operation to be performed by hydraulic means can be accomplished by swinging the valve 153 by hand lever 202. When duct 155 is brought in communication with pipe 165 the recess 192 connects the pipes 163 and 211. Fluid pressure is admitted through pipe 162 to the left side of the piston in cylinder 164 and is exhausted from the right side of the cylinder through pipe 163. If the valve is then turned back to bring duct 155 in communication with pipe 166, the recess 192 then connects pipe 162 with pipe 211. Fluid pressure enters the right end of cylinder 164 through pipe 163 and is discharged from the left end of the cylinder through pipe 162. The air chamber 170 provides an available source of pressure fluid for operation of the motor regulator 97, 98 without disturbing the pressure in the main supply line. It also provides a yielding pressure for operating the brake, through the conduits 160, 156 then in communication.

Figures 7 and 8 show another modified form of warp beam supporting and braking mechanism in combination with a fluid actuated control cylinder 25, said cylinder being directly linked to the brake. Since this form is very similar to the forms previously described, only the structure which differs will be mentioned.

The multi-disk brake has a band 19c which is forced into braking position by means of oblique bolts 22 and ring 23, and is normally pulled to inoperative position by tension springs 21, said bolts and springs being arranged substantially in a circle between members 19c and 23. The ring 23 is journaled by ball bearings 23a upon a stationary hub 23b of a motor flange 7a.

The ring 23 is not axially shiftable, but can be turned through an intermediary control lever 24 so that the bolts 22 are rocked in the same direction. As these bolts approach parallel position to the driving axle 13, the ring 19c is pressed against disk assembly 16 and 17 to apply the brakes, in opposition to tension springs 21. The rotary movement of lever 24, about axle 13 as a center, is effected by means of a pressure fluid acting upon the piston of a control cylinder 25.

The toothed centering disks 14' and 14a for releasably engaging opposed ends of the warp beam, are very similar to disks 14 previously described; however it will be noted that the disks 14' and 14a are fixedly mounted upon shafts 13 and 33 instead of being mounted for limited universal movement as in the preceding form. Portions 47 and 48 are of a special shape so that when the axis of the warp beam is not concentric to the axis of the bevel wall of the centering disks the beam can slightly incline relative to the shafts.

Figures 9 and 10 show still another modified form of beam supporting heads having electromagnetically operated braking mechanisms and a slightly different form of centering disks.

In this form a band 19d is provided in association with braking disks 16 and 17, which band is adapted to be pressed into braking position against disks 16 and 17 by means of a plurality of pins 52b, threadably secured to armature ring 52a. Springs 52 normally resist the movement of pins 52b against band 19d. Each pin is surrounded by a magnetic winding 51, the winding being preferably energized by a stop motion device (not shown) of the warping reel.

The movement of the control piston 37 (Fig. 10) which shifts the shaft 33a axially, also moves the whole braking arrangement accommodated in the casing 66 and frame 2. The braking arrangement is guided by a ground-out bore 53 in the frame 2 and a ground-out bore 6a in portion 6b, said slidable keys 55 preventing turning of the casing 20a.

The beam centering disk 14b in this instance is mounted for limited universal movement on the inner end of shaft 13a, constructed as seat 57. In other words, the end of shaft 13a has a hemispherical recess therein, in which a hemispherical portion 56 is adapted to fit, said portion 56 being held in position by means of a spring 30 and a bolt 30c, thus forming a swivelled connection. Centering disk 14c (Figure 10) is mounted upon countershaft 33a, very much in the same manner as described in connection with members 14' and 33 in Figure 8.

Figures 11 and 12 show another combination. The braking and drive shaft structure as shown in Figure 11 has been previously described, but the countershaft structure for supporting the other end of the warp beam 3 is somewhat different. Figure 12 shows a brakeless countershaft 33d upon which is mounted a centering disk 14d by means of swivel bearing 60, said bearing permitting easy yielding when the beam is not in line, as in the previously described constructions employing ball and socket joints.

In Figure 11, the adjustment of the speed of motor 62 is effected by screw spindle 63, and bevel gears 9a and 10a driven by an electromotor 11 to which control impulses are imparted from a contact tachometer 125 connected with the measuring roller 12.

In the form of invention shown in Figure 13 the adjustment of the speed of motor 62 is effected from a feeling device bearing against the yarn on beam 3. The control elements are shown diagrammatically in this figure and comprise a cylinder 26 in which a piston 27 is slidably mounted, said piston in turn, being mounted upon a spindle 63a. A spring 28 tends to push the piston 27 upwardly.

For controlling the pressure medium acting upon the upper side of the piston (and taken for instance, from the drive circuit), a control cylinder 45 and associated piston 29 are provided. This control piston 29 is connected to one end of a two-armed lever 44, the other end of the lever being connected by a rod 46 to a yoke 46a fulcrumed at 46b. A feeler cylinder 49 is supported by a yoke 46a, and this cylinder bears against the yarn on beam 3. The pivot point of the lever 44 is on an extension 63a' of spindle 63a.

As the yarn on beam 3 increases in diameter, the pressure medium controlled by piston 29 is admitted behind the piston 27 to move the spindle 63a downwardly and thereby increase the flow capacity of motor 62. The return of piston 27 is effected by spring 28 after the piston 29 has opened the return conduit of the pressure medium.

Also in Figure 13 special means are provided for preventing slip between the beam 3 and drive shaft 13. A hub 50 is provided with teeth 50a, said teeth removably engaging teeth 80 in the manner of a clutch, whereas the centering of the beam hub is effected by means of a separate, conically flared inner ring 81a, engaging a bevel plate 82a. The plate 82a is secured to shaft 13 by means of a ball 83d, socketed in a cup 84d of shaft 13. The above described mechanism illustrates a swivelled centering disk which readily adjusts itself to the beam hub.

In the form of construction shown in Figure 14 the motor has a regulator 80 adapted to control the flow capacity of the motor, and to be operated by any suitable means such as a control 63a in Figure 13, said rod responding to the increase in diameter of the yarn on beam 3. The alteration of the flow capacity of motor 62 enables the speed of the motor to be modified, so that the pressure of the driving fluid and the circumferential speed of the beam remain constant.

A safety valve 94 acts against excessive overpressure in the conduit 65, releasing pressure fluid into the return pipe 90. The other structure disclosed in Figure 14 is similar to the structure shown and described in connection with Figures 5 and 5A.

In the form of invention shown in Figure 15 the arrangement of the conduits for the driving medium substantially corresponds to the arrangement shown in Figure 14. As an indicator of the warping speed, the measuring cylinder 12 of the warping machine is used, said cylinder being connected with a contact tachometer 125. The tachometer 125 influences, according to the fundamental adjusted speed, an electromotor 127. This electromotor acts upon a regulator 128 of the fluid motor 62, and through a shaft 129 the element 127 simultaneously acts upon another regulator 130 of pump 81.

The tachometer 125 has a wire $a$ leading to one side thereof and wires $b$ and $c$ leading therefrom, said wires $b$ and $c$ being connectable to switch contacts 131 and 132 respectively. The circuit is completed through electromotor 127 by wires $f$, $g$ and $h$. Within the tachometer 125 there is a conventional contact which is adapted to connect wire $a$ to wire $b$ when the warp speed is too slow, and is adapted to connect wire $a$ with wire $c$ when the warp speed is too fast, therefore only one of the lines $b$ or $c$ is adapted to have current flow therethrough at any one one time. Even when the wires $a$ and $b$ or $a$ and $c$ are connected the circuit must be completed by the shifting of contacts 131 and 132 due to the surging of pressure in line 65.

The polarity of the electromotor may be reversed by shifting the contacts 131, 132 in a manner usual for such switching operations. With this object in view the switch 126 is connected with a control piston 134 by means of rod 133, said control piston being regulated in cylinder 135 by means of a spring 136 to a certain position corresponding to the average pressure of the driving medium in conduit 65. The driving medium pressure acts upon the piston 134 through the conduit 137, 138.

Cylinder 135 is further connected by a conduit 139 to the return conduit 90.

The starting and stopping of the motor 62 and at the same time the disengagement and engagement of the brake is effected by a rotary valve 140.

When the port 140a, in the valve is turned to idling position the short-circuiting conduit 138 is connected with return conduit 64 to thereby allow the pressure fluid to by-pass motor 62, and at the same time port 140b connects conduits 66 and 91 to permit fluid pressure upon the braking disks for the warp beam 3 to be released. The valve is shown in operating position.

The starting and stopping is automatically operated by parts 68, 69, 76, 77, 78, 79 and 96. Lever 77 is fixed to rotary valve 140, said lever being controlled by spring 78 and being held in driving position by a spring actuated pawl 79. The lever can be oscillated into locked position by means of rod 96. The pawl 79 is under the influence of electromagnet 69 in circuit 68. When a warp end breaks the circuit is closed to energize magnet 69 and thereby unlatch pawl 79, at which time spring 78 will rotate the valve to stopping position.

At the starting of the machine a strong increase in pressure is produced in supply conduit 65, owing to the inertia of the beam 3 which is at rest. This increase in pressure acts upon the piston 134, overcomes the counter-pressure of spring 136 and oscillates the switch 126 towards the left in the drawings. Thus the polarity of the electromotor 127 is reversed and the highest starting torque is produced. With the increasing speed of the beam the pressure in conduit 65 drops. The thread speed is, however, still slower than the fundamental speed to which the tachometer is adjusted. Owing to the decreasing pressure upon piston 134 the switch again moves to the right under the force of spring 136 to normal position. The electromotor 127, whose polarity has been reversed, therefore adjusts the motor regulator 128 and pump regulator under the influence of tachometer 125 until the adjusted fundamental speed is attained. This speed is maintained by gradually slowing down the speed of motor 62 and pump 81 according to the increasing diameter of yarn on beam 3.

In the form of construction shown in Figure 16 the control of the brake 20 such as shown in Figure 7 is effected by a lever 24 which is hingedly connected to a rod 182. This rod has a piston 181 on the lower end thereof slidably mounted in a cylinder 180, said piston being normally urged downwardly by a spring 181a. Above the lever 24 a control valve 184 is guided in a corresponding cylinder 183. Through the control valve 184 the pressure conduit 152 of pump 81 can be connected and disconnected from the supply conduit 65 to the motor 62.

The lever 24 is further connected to a toggle 186, 187, fulcrumed on an arm 185, the joint 188 of this toggle being pulled by the action of a light spring 189 against a switch relay 190, 191 and held in the position shown. When a thread breaks and the relay 191 is energized through a suitable circuit such as shown in Figure 15, the toggle 186, 187 bends under the action of armature 190 which suddenly moves forward, to the right in the drawings. The piston 181 thereby pulls lever 24 downwardly and shuts off the driving fluid from motor 62 and simultaneously applies the brake in the casing 20.

At the restarting of the machine the rotary valve 153 is turned in the direction of the arrow to cause bore 178 to connect conduits 179 and 193, at which time the driving fluid will flow from conduit 152 through valve 153 and into the lower portion of cylinder 180 to thereby lift piston 181 and thus connect conduits 152 and 65 to start the motor. This switching takes place very quickly, therefore a spring 119 is employed for returning valve 153 to its initial position such as shown in the drawings, after which the pressure in cylinder 180 sinks, as the oil can flow off through conduits 193, 177 and 90.

I claim:

1. In a warping apparatus, coaxially journalled shaft and countershaft means having means thereon for centering a warp beam between them to their common axis and for forming a positive driving connection between the shaft and the warp beam, a fluid operated motor drivingly connected to said shaft, means for regulating the speed of said motor to maintain a constant peripheral speed of the warp mass, fluid operated braking means coaxial with said shaft for stopping the beam, a common control means for said brake and said motor adapted to cause the brake to be applied when the motor is cut off, a stop motion device, and means controlled thereby to operate said common control means to stop the motor and apply the brake.

2. In a warping apparatus, coaxially journalled shaft and countershaft means having means thereon for centering a warp beam between them to their common axis and for forming a positive driving connection between the shaft and the warp beam, a fluid operated motor drivingly connected to said shaft, fluid operated braking means coaxial with said shaft for stopping the beam, a pump for supplying a pressure fluid, common control means for connecting said pump alternatively to said motor or to said braking means, and means for regulating the speed of said motor to maintain a constant peripheral speed of the warp mass.

3. A warping apparatus as described in claim 2, wherein an air chamber is provided communicating with the connection between said pump and said motor, said common control means being adapted to put said air chamber in communication with said brake-operating means when the latter is connected to said pump.

4. A warping apparatus as described in claim 2, wherein a fluid operated auxiliary control device is provided, said common control means being movable progressively from position to connect said pump with said motor, with said braking means, and with said auxiliary control device.

5. In a warping apparatus, coaxially journalled shaft and countershaft means having means thereon for centering a warp beam between them to their common axis and for forming a positive driving connection between the shaft and the warp beam, a fluid operated motor drivingly connected to said shaft, a pump connected to said motor and adapted to supply a pressure fluid thereto, a regulator on said pump adapted to adjust the latter to a desired winding speed, a regulator for said motor adapted to adjust the latter to conform to said desired winding speed, and braking means coaxial with said shaft for stopping the beam.

6. A warp winding apparatus as described in claim 5, wherein said motor regulator is directly responsive to the linear speed of the yarn.

7. A warping apparatus as described in claim 5, wherein said motor regulator is responsive to the pressure in the conduit connecting said beam to said motor.

8. A warping apparatus as described in claim 5, wherein said motor regulator is under the joint control of the yarn speed and the pressure in the conduit connecting said pump to said motor.

9. A warping apparatus as described in claim 5, wherein stop motion controlled means are provided to short circuit the pressure fluid from said pump past said motor.

10. A warping apparatus as described in claim 5, wherein stop motion controlled means are provided to cut off the supply of pressure fluid from said pump to said motor.

11. A warping apparatus as described in claim 5, wherein said motor regulator is fluid operated and is associated with a valve responsive to the fluid pressure in the conduit connecting said pump to said motor, to admit pressure fluid from said conduit to said motor regulator.

12. A warping apparatus as described in claim 5, wherein said motor regulator is fluid operated and is associated with a valve responsive to the fluid pressure in the conduit connecting said pump to said motor, to admit pressure fluid from said conduit to said motor regulator, said valve having a yielding valve member and a relief port uncovered thereby in a position resulting from excessive pressure in said conduit.

13. A warping apparatus as described in claim 5, wherein said two regulators are fluid pressure operated devices in communication with the conduit connecting said pump to said motor, and a valve adapted to throttle said conduit between said regulators, and a centrifugal governor controlling said valve operated in dependence upon the linear speed of the yarn.

14. A warping apparatus as described in claim 5, wherein an auxiliary fluid operated control device is provided connected with the conduit between said pump and said motor, and a third regulator responsive to pressure in said latter connecting means to control said pump.

15. A warping apparatus as described in claim 5, wherein said motor regulator is a fluid operated device, an air chamber in communication with the conduit between said pump and said motor, a control valve adapted to admit pressure fluid from said air chamber to said motor regulator, said control valve being operated in response to the linear speed of the yarn.

16. In a warping apparatus, coaxially journalled shaft and countershaft means having means thereon for centering a warp beam between them to their common axis and for forming a positive driving connection between the shaft and the warp beam, a fluid operated motor drivingly connected to said shaft, means for regulating the speed of said motor to maintain a constant peripheral speed of the warp mass, fluid operated breaking means coaxial with said shaft for stopping the beam, and a common control means for said brake and said motor adapted to cause the brake to be applied when the motor is cut off, said common control being also adapted to throttle the flow of fluid from the outlet of said fluid motor when the motor is cut off and the brake is applied, to thereby provide increased braking effect.

17. In a warping apparatus, coaxially journalled shaft and countershaft means having means thereon for centering a warp beam between them to their common axis and for forming a positive driving connection between the shaft and the warp beam, a fluid operated motor drivingly connected to said shaft, means for regulating the speed of said motor to maintain a constant peripheral speed of the warp mass, and braking means coaxial with said shaft for stopping the beam, said warp beam centering means comprising interengaging beveled sockets and beveled discs on the warp beam and on said shaft and countershaft.

18. In a warping apparatus, coaxially journalled shaft and countershaft means having means thereon for centering a warp beam between them to their common axis and for forming a positive driving connection between the shaft and the warp beam, a fluid operated motor drivingly connected to said shaft, means for regulating the speed of said motor to maintain a constant peripheral speed of the warp mass, and braking means coaxial with said shaft for stopping the beam, said warp beam centering means comprising conical members mounted for limited universal movement upon said shaft and countershaft, and complementary conical members on the warp beam.

19. In a warping apparatus, coaxially journalled shaft and countershaft means having means thereon for centering a warp beam between them to their common axis and for forming a positive driving connection between the shaft and the warp beam, a fluid operated motor drivingly connected to said shaft, means for regulating the speed of said motor to maintain a constant peripheral speed of the warp mass, and braking means coaxial with said shaft for stopping the beam, said means for centering the warp beam comprising conical members connected by ball and socket joints to said shaft and countershaft, and complementary conical members on the warp beam to engage therewith.

20. In a warping apparatus, coaxially journalled shaft and countershaft means having means thereon for centering a warp beam between them to their common axis and for forming a positive driving connection between the shaft and the warp beam, a fluid operated motor drivingly connected to said shaft, means for regulating the speed of said motor to maintain a constant peripheral speed of the warp mass, and braking means coaxial with said shaft for stopping the beam, said braking means being mounted in a casing and said motor being flanged on said casing.

21. In a warping apparatus, coaxially journalled shaft and countershaft means having means thereon for centering a warp beam between them to their common axis and for forming a positive driving connection between the shaft and the warp beam, a fluid operated motor drivingly connected to said shaft, means for regulating the speed of said motor to maintain a constant peripheral speed of the warp mass, and braking means coaxial with said shaft for stopping the beam, said braking means comprising co-acting sets of friction discs, and fluid pressure operated means including a ring piston adapted to exert a pressure axially to change the relative position of said discs.

22. In a warping apparatus, coaxially journalled shaft and countershaft means having means thereon for centering a warp beam between them to their common axis and for forming a positive driving connection between the shaft and the warp beam, a fluid operated motor drivingly connected to said shaft, means for regulating the speed of said motor to maintain a constant peripheral speed of the warp mass, braking means coaxial with said shaft for stopping the beam, a countershaft head, said countershaft being mounted in said head for axial movement, and fluid operated means for moving said countershaft axially.

23. In a warping apparatus, coaxially journalled shaft and countershaft means having means thereon for centering a warp beam between them to their common axis and for forming a positive driving connection between the shaft and the warp beam, a fluid operated motor drivingly connected to said shaft, means for regulating the speed of said motor to maintain a constant peripheral speed of the warp mass, said shaft and said countershaft being provided with braking means comprising mutually engaging sets of friction discs, a countershaft head said countershaft being mounted in said head to move axially, and fluid pressure operated means for moving said countershaft axially and for operating said brakes.

24. In a warping apparatus, a framework, a warp beam removably supported for rotation on said framework and adapted to have a warp mass wound thereon, a fluid operated motor drivingly connected to said beam, means for regulating the speed of said motor to maintain a constant peripheral speed of the warp mass, fluid operated braking means for stopping the beam, a common control means for said brake and said motor adapted to cause the brake to be applied when the motor is cut off, a stop motion device, and means controlled thereby to operate said common control means to stop the motor and apply the brake.

25. In a warping apparatus, a framework, a warp beam removably supported for rotation on said framework and adapted to have a warp means wound thereon, a fluid operated motor drivingly connected to said beam, a pump connected to said motor and adapted to supply a pressure fluid thereto, a regulator on said pump adapted to adjust the latter to a desired winding speed, a regulator for said motor adapted to adjust the latter to conform to said desired winding speed, and braking means for stopping the beam.

26. A warp winding apparatus as described in claim 24 wherein the motor regulator is directly responsive to the linear speed of the warp.

GEORG WIGGERMANN.